United States Patent
Buchkremer

(10) Patent No.: US 8,387,776 B2
(45) Date of Patent: Mar. 5, 2013

(54) TRANSPORT SYSTEM

(75) Inventor: Wolfgang Buchkremer, Grevenbroich (DE)

(73) Assignee: KHS GmbH, Dortmund (DE)

( * ) Notice: Subject to any disclaimer, the term of this patent is extended or adjusted under 35 U.S.C. 154(b) by 153 days.

(21) Appl. No.: 13/058,680

(22) PCT Filed: Oct. 21, 2009

(86) PCT No.: PCT/EP2009/007530
§ 371 (c)(1),
(2), (4) Date: Feb. 11, 2011

(87) PCT Pub. No.: WO2010/049082
PCT Pub. Date: May 6, 2010

(65) Prior Publication Data
US 2011/0132724 A1  Jun. 9, 2011

(30) Foreign Application Priority Data
Oct. 29, 2008 (DE) .......... 10 2008 053 715

(51) Int. Cl.
*B65G 45/08* (2006.01)
(52) U.S. Cl. ........................ 198/500; 184/15.3
(58) Field of Classification Search .......... 198/500, 198/850–853; 184/15.1, 15.3
See application file for complete search history.

(56) References Cited

U.S. PATENT DOCUMENTS

| | | | |
|---|---|---|---|
| 4,368,803 A | 1/1983 | Dombroski et al. | |
| 5,272,924 A * | 12/1993 | Tassic et al. | 73/862.391 |
| 7,259,854 B2 * | 8/2007 | Schnell | 198/502.1 |
| 7,293,465 B2 | 11/2007 | Nassar et al. | |
| 7,325,669 B2 * | 2/2008 | Frost et al. | 198/502.3 |
| 7,494,004 B2 * | 2/2009 | Stolyar et al. | 198/810.02 |
| 7,635,060 B2 * | 12/2009 | Lagneaux | 198/810.04 |
| 2001/0003163 A1 | 6/2001 | Bungert et al. | |
| 2007/0222612 A1 | 9/2007 | Krisl | |

FOREIGN PATENT DOCUMENTS

| | | |
|---|---|---|
| DE | 3040480 | 5/1982 |
| DE | 4444263 | 5/1996 |
| DE | 19540594 | 5/1997 |
| DE | 19826513 | 12/1999 |
| DE | 102005037117 | 5/2006 |
| EP | 0716991 | 6/1996 |

* cited by examiner

*Primary Examiner* — James R Bidwell
(74) *Attorney, Agent, or Firm* — Occhiuti Rohlicek & Tsao LLP

(57) ABSTRACT

A conveying system for conveying containers includes a conveyor for conveying packaging. The conveyor includes a conveying element moveable in a conveying direction along a movement path, the conveying element forming a conveying surface for the packaging, an electric measuring module on the conveying element, the module having a sensor for detecting a physical variable, and an RFID transponder having an RFID transponder circuit that interacts with the sensor, an RFID read/write head on the path of movement of the conveying element for wireless data transmission with the a measuring module and for transmission of electric power to the measuring module, a lubricant supply system for applying a belt lubricant, the lubricant supply system being controlled and/or regulated at least in part on the basis of data read by the read/write head.

17 Claims, 1 Drawing Sheet

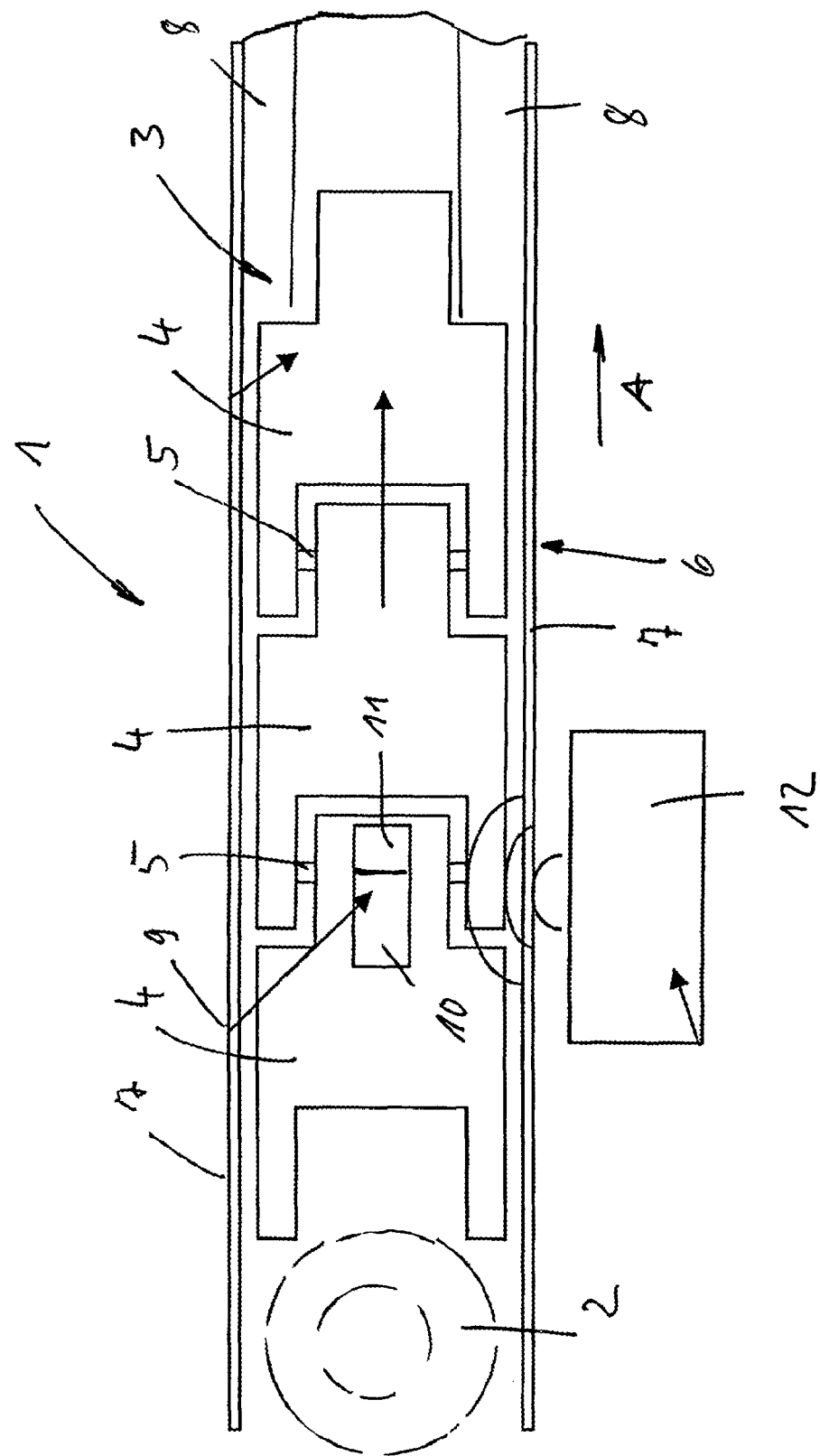

TRANSPORT SYSTEM

CROSS-REFERENCE TO RELATED APPLICATIONS

This application is the National Stage of International Application No. PCT/EP2009/007530, filed on Oct. 21, 2009, which claims the priority of German Patent Application No. 10 2008 053 715.2, filed on Oct. 29, 2008. The contents of both applications are hereby incorporated by reference in their entirety.

FIELD OF THE DISCLOSURE

The invention relates to a conveying system for packaging means or packaging means groups.

BACKGROUND

"Packaging means" in terms of the invention refers to packaging or receptacles that are conventionally used in the foodstuffs sector and in this case especially also in the beverage sector, in particular containers, such as, for example, bottles, cans, also soft packaging, for example that produced from cardboard and/or plastic film and/or metal film, transport containers, e.g. bottle cases etc. "Packaging means groups" in terms of the invention refers to groups of packaging means assembled together, for example sets made up of such packaging means.

"Treatment machines" in terms of the invention refers to machines or devices for treating and/or processing packaging means, e.g. cleaning machines, rinsers, filling machines, closing machines, machines for printing on packaging means, labelling machines, machines for packing and/or unpacking, in particular packaging machines or machines for applying shrink film, etc.

Different forms of conveying systems for packaging means and their conveyors are known, for example as "external" conveyors, i.e. conveyors that are located outside treatment machines for supplying packing means to treatment machines, or as machine-internal conveyors for moving the packaging means within a treatment machine or through such a machine.

Especially known are conveying systems where the conveying element of the conveyor moving the packaging means in a conveying direction is a conveying chain with a plurality of chain links, the packaging means being held standing upright on the conveying chain or being suspended from said chain when being conveyed.

With conveyors of this type and in this case, for example, with a conveyor that is a component part of a machine for packaging bottles, it is also known (DE 195 40 594 A1) to provide on the conveyor or on the conveying section formed by said conveyor, a measuring module that is not entrained with the conveying chain, by way of which measuring module the presence or absence of bottles is monitored.

SUMMARY

It is the object of the invention to provide a conveying system that, in a simplified but very reliable manner, enables constant and in particular also direct detection of physical variables on the conveying element that is moving in the conveying direction.

The characteristic of the conveying system according to the invention or of the at least one conveyor of said system is that at least one measuring module that is entrained with the conveying element is provided on the conveying element moved in the conveying direction, said measuring module being realized as a RFID-TAG or RFID transponder or being realized in the manner of such an RFID-TAG or RFID transponder or of its architecture and interacting with at least one sensor for detecting at least one physical value, for example for detecting forces and/or temperatures and/or pressures.

In the case of a preferred embodiment of the invention, the conveying element is a conveying chain that comprises a plurality of interconnected chain links, at least one measuring module then being provided on at least one chain link or at least one measuring module being provided on a plurality of chain links in each case, the sensor of said module detecting physical variables, which, for example, define or reflect the state of the conveyor, and/or also other physical variables, e.g. the force acting between two chain links. Said measuring data is then read in a wireless manner by an RFID read/write head, i.e. by means of an electromagnetic field, and is then consequently actively available. Continuous, automatic determining and/or monitoring of the state of the conveyor and/or continuous, automatic controlling of the conveyor are consequently possible by using the measuring data. For example, it is possible to determine the friction or the friction coefficient between the conveyor or its conveying element (e.g. conveying chain) and a guiding means in the loaded and non-loaded state of the conveying element, the friction between the conveying element and the packaging means located on said conveying element, etc. in a continuous and automatic manner.

Further developments, advantages and application possibilities of the invention are produced from both the following description of exemplary embodiments and from the FIGURES. In this case, all the features described and/or graphically represented, individually or in arbitrary combination, are in principle objects of the invention, irrespective of their summary in the claims or their dependency. The content of the claims is also made a component part of the description.

DESCRIPTION OF THE DRAWINGS

The invention is explained in more detail below by way of the FIGURE, which shows a very simplified representation and top view of a conveyor of a conveying system according to the invention.

DETAILED DESCRIPTION

The conveyor, given the general reference 1 in the FIGURE, is a component part of a system for treating containers, for example bottles 2, which are oriented standing upright, i.e. with their container axis in the vertical direction and consequently oriented at right angles to the drawing plane of the FIGURE, on the conveyor 1 or on the conveying surface formed by said conveyor and are moved with the conveyor 1 in the conveying direction that is identified by the arrow A. The conveyor 1 is, for example, an external conveyor of an overall system for treating containers 2, for example a conveyor via which the containers 2 are supplied to a system for treating the containers 2, e.g. for cleaning, filling, closing, labelling, packaging etc and/or are conveyed within such a system between different machines or treatment devices.

The conveying element of the conveyor 1, in the embodiment represented, is a conveying chain 3 with a plurality of chain links 4, which in each case are pivotally interconnected via shafts or bolts 5. The conveying chain 3 is realized in the manner known to the expert as an endlessly rotating driveable chain, which is guided via at least two chain and guide wheels (not shown) at the start and at the end of the conveying section formed by the conveyor 1.

The conveyor 1 additionally comprises a device frame 6, which forms lateral guide rails 7 for the containers 2 above the conveying plane of the conveying chain 3 and below the conveying plane contact and sliding surfaces 8, against which the conveying chain 3 or its chain links 4 abut by way of their underside. The reference 9 is given in the FIGURE to an electric measuring module, which is realized as a TAG or RFID transponder or has a design similar to an RFID-TAG or RFID transponder, with an RFID transponder circuit 10, which, for example, essentially comprises an antennae structure, an analog circuit structure for receiving and sending data and for obtaining electric power from the electromagnetic field received by the antennae structure, a digital circuit structure and at least one memory structure for storing data. The memory structure is realized at least in part as a read/write memory and also includes a non-volatile storage means. The measuring module 9 contains at least one sensor 11 that interacts with the RFID transponder circuit 10 for measuring at least one physical variable and is, as known of RFID-TAGS, extremely flat or label-like and is secured in a suitable manner to the respective chain link 4 of the conveying chain.

At least one RFID read/write head 12 (RFID transceiver) is provided on the conveyor 1 or on the path of movement of the chain links 4, i.e. a read/write head 12 which, in a wireless manner via radio or via an electromagnetic field, enables a bidirectional data transmission between itself and the respective measuring module 9 provided on the conveying chain 3 among other things for reading the measuring data of the sensor 11 stored in the memory of the RFID transponder circuit 10 when measuring module 9 moves past the read/write head 12. In the simplest case, it is sufficient to provide the measuring module 9 only on one chain link 4.

However, it is also possible to provide at least one measuring module 9 in each case on a plurality of chain links 4 or on a plurality of groups of chain links 4, or to provide all the chain links 4 with one measuring module 9.

In dependence on the embodiment of the respective sensor 12, the most varied physical values and/or operating parameters can be determined using the measuring modules 9. The corresponding data read by the read/write head 12 is then evaluated and/or processed in a, for example, central evaluating and control device, e.g. a computer, and can be used for the most varied documenting and/or control and/or regulating and/or monitoring purposes, etc.

The sensor 11 of the at least one measuring module 9 is, for example, an electric sensor for measuring the tensile forces acting between two chain links 4 or at the bolt 5 at that location and is for this purpose, for example, a strain gauge pressure transducer. From the measured values supplied by the at least one measuring module 9 corresponding to said tensile forces, it is then possible to determine, among other thing:

the coefficient of friction between the conveying chain 3 and the conveying chain guiding means when idling, i.e. with the conveying chain 3 idling or not loaded;

the coefficient of friction between the loaded conveying chain 3 and the conveying chain guiding means, i.e. when the conveying chain 3 is loaded with containers 2, with non-braked containers 2;

the coefficient of friction between the loaded conveying chain 3, on the one hand, and the conveying chain guiding means and the braked containers 2, i.e. the containers 2 held back from being entrained by the conveying chain 3, on the other hand, in order to determine the coefficient of friction between the containers 2 and the conveying chain 3 from said coefficient of friction and the coefficient of friction between the loaded conveying chain 3 and the conveying chain guiding means with non-braked containers 2.

Using the data read by the read/write head 12 and the coefficients of friction determined therefrom, it is also possible to hold the degree of efficiency of the conveyor 1 permanently steady and to this end to apply, for example lubricant in an optimum metered manner by means of a lubricant supply system, for example onto the sliding surfaces 8. In addition, by way of the measured data supplied by the measuring modules 9, it is also possible to detect, in good time, potential wearing of the functional elements of the conveyor 1, in particular also wearing of the conveying chain 3.

It is obvious that with the corresponding embodiment of the respective sensor 1, other physical variables, for example pressure and/or temperature, can be detected using the at least one measuring module 9 and can be read via the read/write head 12. In addition, with the corresponding embodiment of the respective sensor 11 or of a plurality of sensors 11 provided on the at least one measuring module 9, combinations of a plurality of physical variables can be detected with the at least one measuring module 9, stored there and read by the read/write head 12 for further use or processing.

The invention has been described above by way of one exemplary embodiment. It is obvious that numerous modifications and conversions are possible.

It has been assumed above that the conveying element of the conveyor 1 is a conveying chain 3 with a plurality of chain links 4. In principle, the invention can also be used in an advantageous manner with other conveyors or conveying systems in order, directly on the conveying element and/or on its conveying members, to detect physical variables that are relevant to the operation and/or the maintenance and/or monitoring and/or documenting The invention has been described above in conjunction with a conveyor 1 for bottles or similar containers. Obviously the embodiment according to the invention is also useable with other conveyors or conveying systems, for example for conveyors or conveying systems for conveying packaging means in general, but also for conveying containers in the form of cases, for example in the form of cases of bottles or for conveying packaging means that have been assembled together to form groups or corresponding sets.

The general advantage of the invention is that physical variables or parameters, such as, for example, force, pressure, temperature, etc. can be detected on the respective conveying element in an active and continuous manner during the normal operation of the conveying element wherever said variables or parameters are of interest, and that the corresponding measured values or measured data is read in a contactless manner, i.e. via a radio link or via an electromagnetic field, in a particularly simple manner at a high level of transmission security, from the respective measuring module 9 to at least one read/write head that does not rotate with the conveying element.

LIST OF REFERENCES

1 Conveyor
2 Container or bottle
3 Conveying chain
4 Chain link
5 Bolt
6 Frame
7 Guide rail 8 Sliding guide
9 Measuring module in the form of an RFID-TAG
10 RFID transponder circuit
11 Electric sensor, for example strain gauge pressure transducer
12 Read/write head
A Conveying direction of the conveying chain

The invention claimed is:

1. A conveying system for conveying containers, said conveying system comprising: at least one conveyor for conveying packaging means and/or packaging means groups, said conveyor including a conveying element that is moveable in a conveying direction along a path of movement, the conveying element forming a conveying surface for the packaging means and/or packaging means groups, at least one electric measuring module on the conveying element, the module having at least one sensor for detecting at least one physical variable, and an RFID transponder having an RFID transponder circuit that interacts with the at least one sensor, at least one RFID read/write head on the path of movement of the conveying element for wireless data transmission with the at least one measuring module and for transmission of electric power to the at least one measuring module, a lubricant supply system for applying a belt lubricant, said lubricant supply system being controlled and/or regulated at least in part on the basis of data read by the read/write head.

2. The conveying system of claim 1, wherein the at least one sensor is a component part of the measuring module or of the RFID transponder circuit.

3. The conveying system of claim 1, wherein the at least one sensor comprises a force-measuring sensor.

4. The conveying system of claim 1, wherein the at least one sensor comprises a temperature sensor.

5. The conveying system of claim 1, wherein the at least one sensor comprises a pressure sensor.

6. The conveying system of claim 1, wherein the conveying element comprises a plurality of conveying members that connect to one another to form a conveying member that extends along the conveying direction.

7. The conveying system of claim 1, wherein the conveying element comprises a plurality of conveying members that connect to one another to form a conveying element that extends in the conveying direction, wherein at least one measuring module is associated with each of the conveying members.

8. The conveying system of claim 1, wherein the at least one measuring module and/or the at least one sensor of said measuring module are designed for detecting forces acting between at least two conveying members.

9. The conveying system of claim 6, wherein the conveying element comprises a conveying chain, and wherein the conveying members comprise chain links.

10. A conveying system for treating packaging means, the system comprising an external conveyor as recited in claim 1.

11. A conveying system for treating packaging means, the system comprising a device-internal conveyor as recited in claim 1.

12. The conveying system of claim 1, wherein the at least one conveyor and/or the conveying element are configured for conveying bottles.

13. The conveying system of claim 1, wherein the conveying element comprises a plurality of groups of conveying members, wherein at most one measuring module is associated with each group of conveying members.

14. The conveying system of claim 3, wherein the sensor comprises a strain gauge pressure transducer.

15. The conveying system of claim 6, wherein a measuring module is associated with at most one conveying member.

16. The conveying system of claim 8, wherein the forces are tensile forces.

17. An apparatus for conveying containers, said apparatus comprising: a conveying element for conveying said containers along a conveying direction; means for measuring a physical variable associated with said conveying element; means for wirelessly transmitting data representative of said physical variable; and a lubricant supply system configured to be controlled based at least in part on data provided by said means for wirelessly transmitting data.

* * * * *